United States Patent
Hendrix (10) Patent No.: US 10,390,498 B2
(45) Date of Patent: Aug. 27, 2019

(54) ENGAGING TOOL

(71) Applicant: Lynn Hendrix Equipment, Livingston, TX (US)

(72) Inventor: Trent Hendrix, Livingston, TX (US)

(73) Assignee: Lynn Hendrix Equipment, LLC, Livingston, TX (US)

( * ) Notice: Subject to any disclaimer, the term of this patent is extended or adjusted under 35 U.S.C. 154(b) by 113 days.

(21) Appl. No.: 15/708,478

(22) Filed: Sep. 19, 2017

(65) Prior Publication Data

US 2018/0332782 A1   Nov. 22, 2018

Related U.S. Application Data

(60) Provisional application No. 62/507,976, filed on May 18, 2017.

(51) Int. Cl.
*A01G 23/00* (2006.01)
*A01G 23/06* (2006.01)
*B27B 33/20* (2006.01)

(52) U.S. Cl.
CPC .............. *A01G 23/06* (2013.01); *B27B 33/20* (2013.01)

(58) Field of Classification Search
CPC .... A01G 23/067; A01G 23/091; A01G 23/06; B23B 5/22; B23B 5/207; B23D 61/06; B23D 61/065; B23D 65/023; B27B 33/20
USPC ....... 83/836, 837; 144/24.12, 172, 176, 235, 144/363, 218, 241; 407/44, 62, 77, 113; 37/302
See application file for complete search history.

(56) References Cited

U.S. PATENT DOCUMENTS

| | | | | |
|---|---|---|---|---|
| 5,205,199 A | * | 4/1993 | MacLennan | B23D 61/04 83/839 |
| 5,207,748 A | * | 5/1993 | Katbi | B23B 27/143 407/114 |
| 5,211,212 A | * | 5/1993 | Carlson | A01G 23/091 144/241 |
| 5,365,805 A | * | 11/1994 | Pantzar | B23C 5/202 407/114 |
| 5,377,731 A | * | 1/1995 | Wildey | B23D 61/065 144/218 |
| 5,813,308 A | * | 9/1998 | Wildey | B23D 61/04 83/835 |
| 6,810,783 B1 | * | 11/2004 | Larose | B23D 61/06 144/34.1 |
| 7,713,006 B2 | * | 5/2010 | MacLennan | B23C 5/207 407/113 |
| 8,061,396 B2 | * | 11/2011 | MacLennan | A01G 23/067 144/218 |
| 8,584,717 B2 | * | 11/2013 | Leonardi | A01G 23/06 144/24.12 |
| 9,120,154 B2 | * | 9/2015 | Hecht | B23B 27/1622 |

* cited by examiner

*Primary Examiner* — Robert E Pezzuto
(74) *Attorney, Agent, or Firm* — Braxton Perrone, PLLC (57) ABSTRACT

A system and method for an engaging tool. Removing debris, trees and clearing land and paths requires the use of specific tool and machinery. To grind, break and shred wood, the machines must be fitted with proper attachments and engaging tools. One tool includes a front a front face and a back face connected by two opposing side faces and an opposing top face and base face. The front face has a concave shape and an outer channel which extends inwardly into the front face. The front face also has a tube a tube extending outwardly from said front face. The tube is located within the outer channel.

17 Claims, 7 Drawing Sheets

ENGAGING TOOL

PRIORITY

The present invention claims priority to Provisional Application No. 62/507,976 filed May 18, 2017, the entirety of which is hereby incorporated by reference.

BACKGROUND OF THE INVENTION

Technical Field

The present invention relates to an apparatus for cutting, grinding, shredding, clearing, milling wood, tree shrubs, etc.

Description of Related Art

Removing debris, trees and clearing land and paths requires the use of specific tool and machinery. These machines must function to grind, break and shred wood. To function properly the machine must be fitted with proper attachments and engaging tools. By requiring many attachments and engaging parts the likelihood of pieces being lost or not fitting properly increases. Consequently, there is a need for fewer attachments and engaging parts to reduce the chances of missing parts and possible malfunctioning of the machine.

BRIEF DESCRIPTION OF THE DRAWINGS

The novel features believed characteristic of the invention are set forth in the appended claims. The invention itself, however, as well as a preferred mode of use, further objectives and advantages thereof, will be best understood by reference to the following detailed description of illustrative embodiments when read in conjunction with the accompanying drawings, wherein:

DETAILED DESCRIPTION

Several embodiments of Applicant's invention will now be described with reference to the drawings. Unless otherwise noted, like elements will be identified by identical numbers throughout all figures. The invention illustratively disclosed herein suitably may be practiced in the absence of any element which is not specifically disclosed herein.

Figure 1A:
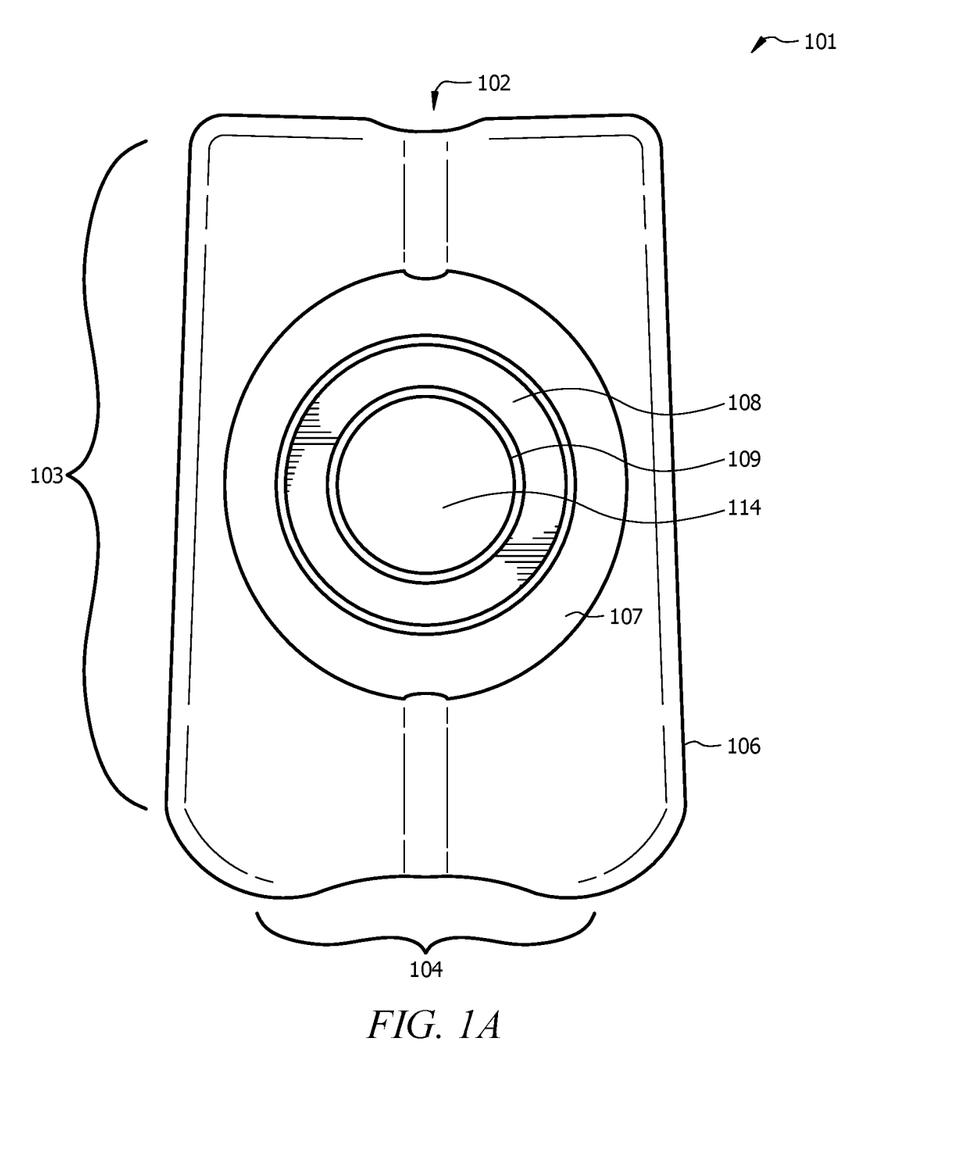
FIG. 1A is a top planar view of the unit in one embodiment.

FIG. 1A is a top planar view of the unit in one embodiment. The engaging tool 101 can comprise any suitable material known in the art such as metal, plastic and combinations thereof. In one embodiment the tool 101 comprises a steel body. In on embodiment the body comprises 42CrMo. In one embodiment the carbide cover comprises YG11C. In an embodiment, the modular engaging tool 101 can comprise opaque material, not allowing an individual to see through the unit. The engaging tool can comprise one metal or a combination of different metals.

In one embodiment, the engaging tool 101 comprises corners that are sharp on the ends or round at the ends, which is discussed further below. The modular unit can comprise virtually any dimensions. In one embodiment, the modular engaging tool 101 has a height ranging from 40 to about 80 mm, a width ranging from 40 mm to about 60 mm, and a length ranging from about 60 to about 120 mm. These dimensions are for illustration purposes only and should not be deemed limiting.

In one embodiment, and as depicted, the unit 101 comprises a top face 102, two side faces 103, a base face 104, a front face 106 and a back face 105 (not depicted). In one embodiment, the top face 102 is generally parallel to the base face 104 and approximately perpendicular to the side faces 103. As depicted, the front face 106 is generally parallel to the back face 105.

Turning to the top face 102, in one embodiment, and as depicted, the face 102 extends for the width and height of the entire unit 101. Thus, as depicted, the top face 102 extends between the back face 105 to the front face 106. In one embodiment, the same is true for the bottom face 104.

Figure 1B:
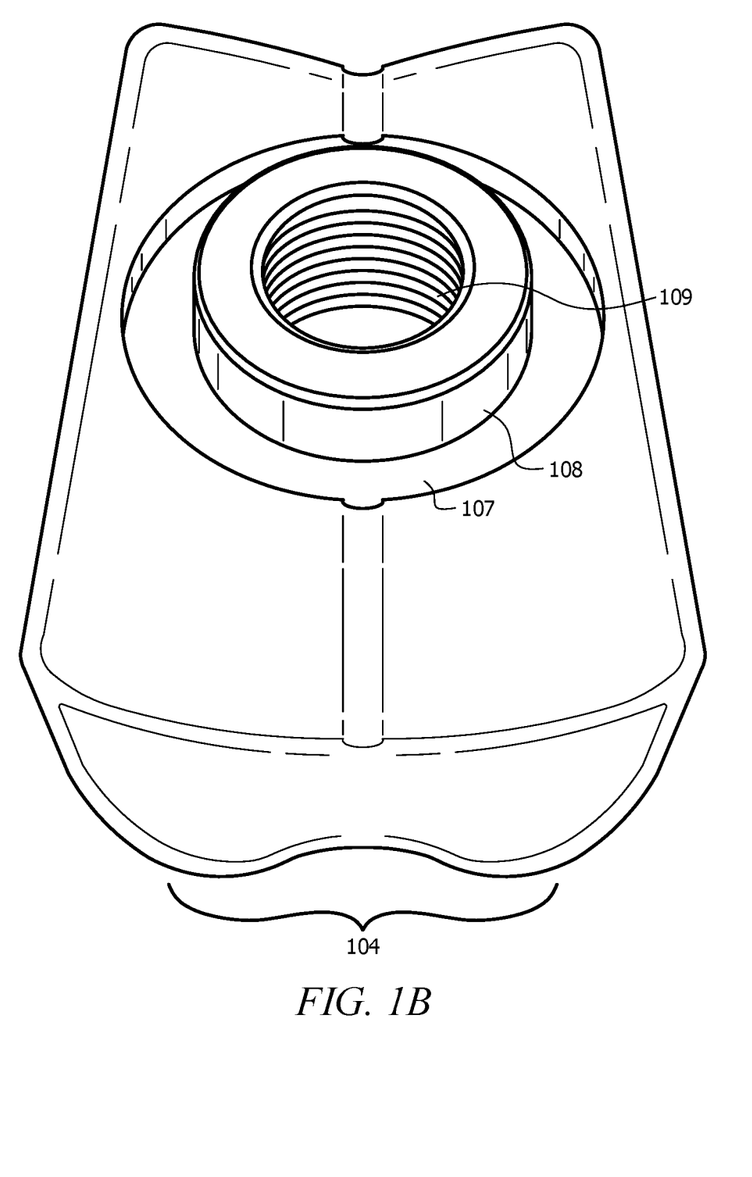
FIG. 1B is a top perspective view of the unit in one embodiment.

FIG. 1B is a perspective view of the unit 101 in FIG. 1A. As can be seen, in one embodiment the front face 106 comprises a concave shape. The edges of the front face 106, those that intersect the side faces 103, are at a higher position relative to the center of the front face 106. Thus, the left side of the front face 106 slopes downward and inward as does the right side of the front face 106. The two downward sloping sides meet in the middle of the front face 106. The angle of the front face 106 as measured at the intersection of the inflection point, can range from about 30 degrees to about 160 degrees, depending upon the desired application.

In one embodiment, the front face 106 comprises an outer channel 107. The outer channel 107 sits on the front surface 106 of the engaging tool. As depicted, the channel 107 is centered along the length of the unit 101. Thus, the center of the outer channel 107, in one embodiment, is equidistant from the top face 102 as to the bottom face 104. In other embodiments, however, the outer channel is not centered along the unit's length.

In one embodiment the center of the outer channel corresponds to the concave V shape of the front surface 106. Thus, the center of the outer channel 107 aligns with the inflection point of the concave shape. In one embodiment, the channel of a tool holder and the channel of an engaging tool are coupled.

The radius of the channel 107 can extend between 15 mm and 30 mm. While the channel 107 is depicted as being circular in shape, this is for illustrative purposes only and should not be deemed limiting.

The depth of the channel 107 can vary depending upon the desired application. In one embodiment the depth of the channel 107 varies. For example, as depicted, the depth of the channel 107 increases moving from the center line of the unit 101 corresponding to the inflection point and moving outward. Thus, the depth of the channel 107 is at its minimum at the inflection point and at its maximum at the extreme outer edges closer to the side faces 103. In other embodiments, however, the depth of the channel is uniform.

The channel 107 can be formed using virtually any method known in the art. In one embodiment the channel 107 is simply a void or absence of material.

As depicted, the channel 107 comprises an outer concentric circle. Located within the channel 107 is a tube 108. The tube 108 extends upward and outward from the front surface 106 of the engaging tool 101. In one embodiment, the tube 108 extends between about 5-25 mm, as measured as the greatest distance above the channel 107.

Figure 2:
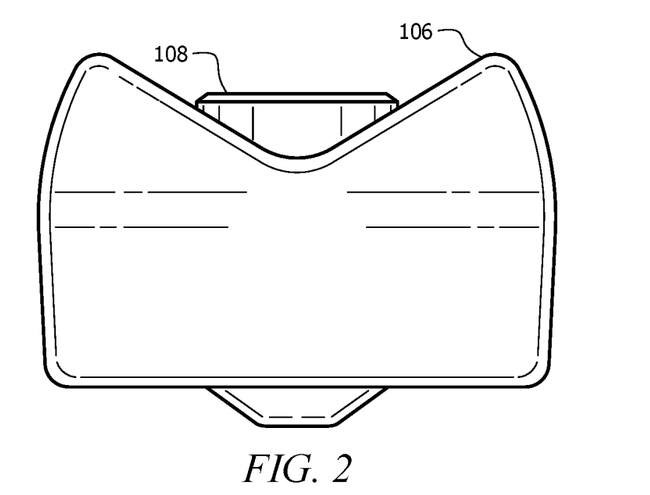
FIG. 2 is a front planar view of the unit in one embodiment.

In some embodiments the top of the tube 108 is elevated above the front face 106. In other embodiments, however, the top of the tube 108, is lower in elevation than the side faces 103. FIG. 2 shows a front profile of the unit 101. As can be seen, the tube 108 is nestled in a valley between the two elevated side faces 103. Thus, if a flat object were laid across the side faces 103, the object would not rest or otherwise touch the tube 108.

The tube 108 can comprise virtually any material. In one embodiment the tube 108 comprises the same material as the unit 101.

The tube 108 is coupled to the unit 101. In one embodiment the tube 108 is permanently coupled to the unit 101. The tube 108 can be coupled via any method known in the art including, but not limited to, welding, soldering, or any other method used to couple two or more items. In one embodiment the tube 108 is permanently coupled to the unit 101 during use.

While one embodiment has been described wherein the tube 108 is coupled to the unit 101, in other embodiments the tube 108 and the unit 101 are integrally made. Thus, they are made at the same time using the same material. A molded piece is an example of an item which was integrally made. An integrally made piece would not include, for example, a tube which was made separately and then subsequently welded to couple to the unit 100. Thus, in one embodiment the tube 108 and the unit 101 are integrally made as a single unit. In other embodiments, however, as described above, the unit 101 and the tube 108 are not integrally made as a single unit but instead are subsequently coupled via welding or the like.

While the tube 108 is shown and described as being cylindrical, this is for illustrative purposes and should not be deemed limiting. Other shapes, including square, rectangular, etc. can also be utility. As depicted, the tube 108 has an outer diameter and an inner diameter. The outer diameter can range from about 5 to about 30 mm. The inner diameter can range from about 3 to about 25.

In one embodiment the outer channel 107 comprises a diameter, and the tube 108 comprises an outer diameter, and the tube 108 outer diameter is less than the diameter of the channel 107. The difference between the outer diameter of the outer channel 107 and the diameter of the channel 107 is defined as the outer channel 107 width.

The tube 108, in one embodiment, is hollow defining an internal cavity 114. In one embodiment the cavity 114 is open, allowing the cavity 114 to accept objects inserted there through. In one embodiment, the top opening of the cavity 114 is parallel to the top face 106.

In one embodiment the cavity 114 extends completely from the front face 106 to the back face 105. In such embodiments, a bolt, for example, can be inserted on the front face 106 and extend through the back face 105. Such an embodiment is referred to as an unrestricted cavity. Thus, an unrestricted cavity comprises two openings: an entrance opening and an exit opening. Conversely, a restricted cavity is a cavity which comprises only a single opening. A restricted cavity comprises an opening on one side and terminates in a closed or sealed opposing end. A sealed end, as used herein, refers to a stoppage which prevents an object from passing. The sealed end can comprise a cap or other solid material. In one embodiment the sealed end coincides with a solid back face 105. A bolt cannot extend through to the back side with a restricted cavity. Instead, a bolt can be inserted to the open end of a restricted ending and will be stopped at the closed end. The unit 101 described herein can comprise restricted cavities, unrestricted cavities, and combinations thereof.

In one embodiment, the tube 108 comprises threading. In one embodiment, and as depicted, the tube 108 has threading 109 on the inner portion of the channel. While one embodiment is described wherein the tube 108 comprises inner threading, this is for illustrative purposes only and should not be deemed limiting. In other embodiments, for example, the tube 108 comprises outer threading, or threading located on the outer diameter.

The threading 109 extends at least partially along the length of the tube 108. In one embodiment the threading 109 extends for the entire length of the tube 108. In one embodiment the threading 109 extends at least partially along the length of the cavity 114. In another embodiment, the threading 109 extends for the entire length of the cavity 114. The threads 109 are used to engage similar threads on an external object, such as a bolt.

Figure 5:
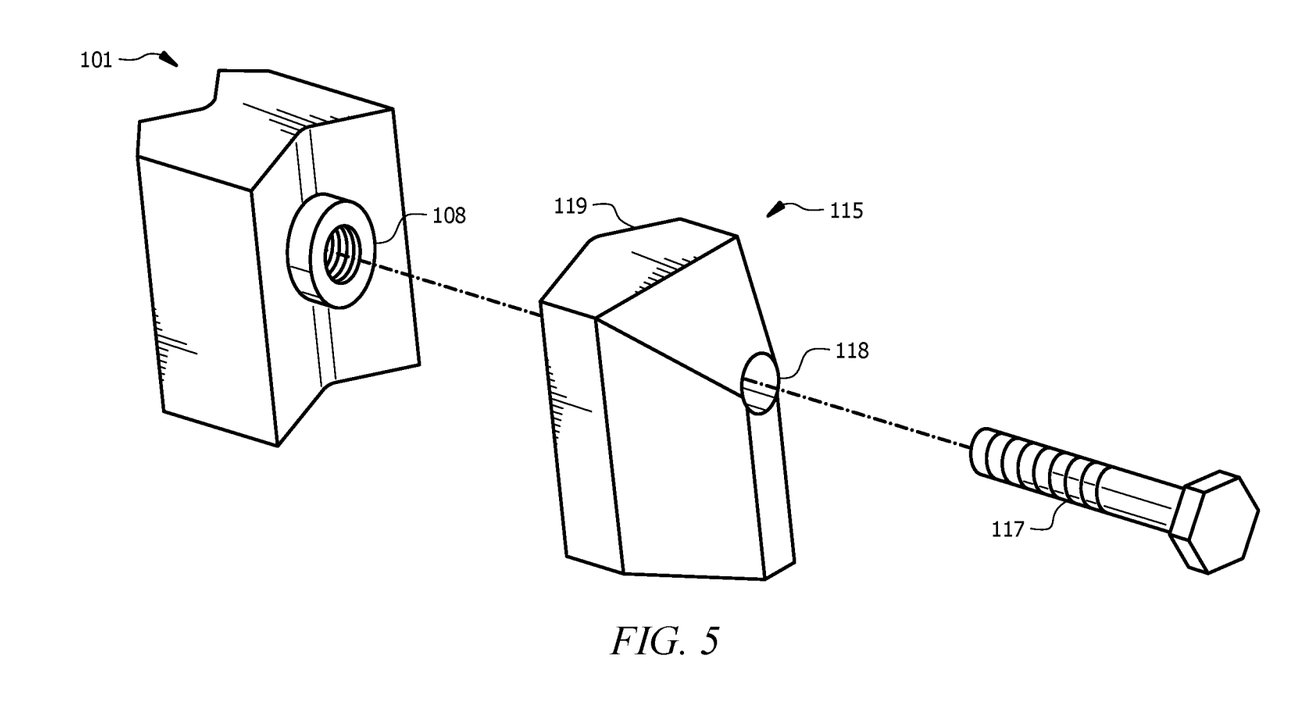
FIG. 5 is a perspective view of the tool holder in one embodiment.

Turning now to FIG. 5, FIG. 5 is a perspective view of the tool holder in one embodiment. As seen in FIG. 5, the concave V-shape of the front face 106 of the engaging tool 101 allows for a locking mechanism with the surface of the tool holder. The concave V-shape allows for interlocking with the convex surface of the tool holder 115.

As seen in FIG. 5, the front surface 106 of the engaging tool 101 is an inverse of the binding region of the tool holder 115. The concave V surface of the engaging tool 101 interlocks with the convex V shape of the tool holder 115. The tube 108 is received within the receiving void (not shown) of the tool holder 115. The tube 108 secures with the tool holder 115 as previously described and without having an external and loose tube. A bolt 117, or other coupling device, can then be inserted through tool holder 115 hole 118, through the tool holder 115, and engage with the tube 108. This allows the engaging tool 101 to be coupled to and secured to the tool holder 115. The secure interlocking system reduces the likelihood of the engaging tool sliding in position with the tool holder 115.

The tube 108 works by coupling the engaging tool 101 and a tool holder which is attached to a machine. Previously, the engaging tool 101 and the tool holder each had a channel allowing for a coupling mechanism, such as a separate tube. The separate tube, which was not permanently coupled to the engaging tool 101, would mate with a recess on a tool holder. During assembly an operator would need to position the tube to align perfectly between the engaging tool 101 and the holder. The user would then put a coupling device, such as a bolt, through the holder, through the tube, and secure it to the engaging tool. Through this process, there was a likelihood of pieces getting lost by the user, the tube not coupling as required, etc.

The system and device described herein allows elimination of a separate tube portion which must be positioned during assembly. Instead, the tube 108 is coupled directly to the engaging unit 101.

The location of the tube 108 on the engaging unit 101 provides several benefits. First, it is the elimination of a separate part. This reduces the cost, and complexity of manufacturing as well as assembly. This also reduces the likelihood that the separate tube piece can become dislodged or lost.

A second benefit is increased ease of assembly. Before four pieces, the engaging unit, the tube, the holder, and the bolt, all had to align. They each were capable of moving independently, so aligning all four could prove difficult. With embodiments wherein the tube 108 is affixed to the unit there are only three pieces which must be aligned: the unit, the bolt, and the holder. Thus, assembly and disassembly time is decreased.

A third benefit is increased safety. Because there are fewer parts involved in assembly and disassembly, there are fewer opportunities for the installation to get off-track.

An additional benefit is the increased thread distance. The thread distance, as used herein, refers to the distance of the threading along the cavity 114. Using an external tube, the threading was limited to threading on the unit itself. However, by incorporating an attached tube 108, the threading length can be increased. As an example, without an integrated tube 108, the thread length would be limited to about an inch. However, with an integrated tube 108, the thread length can be increased by the length of the tube 108 which extends above the inflection point. An increased thread length provides for greater coupling, reducing the likelihood that the engaging tool 101 could become decoupled from the holder. Thus, an increased thread length also provides for increased stability and safety.

Figure 3:
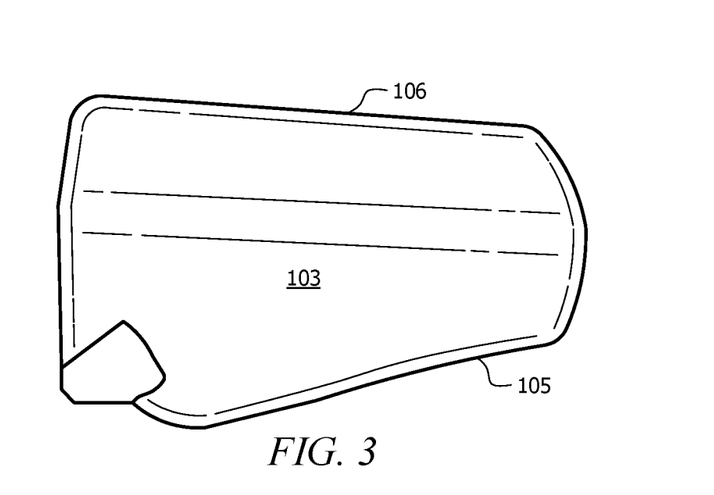
FIG. 3 is a side profile view of the unit in one embodiment.

Turning now to FIG. 3, FIG. 3 is a side profile view of the unit in one embodiment. As can be seen, in the embodiment depicted, the front face 106 and the back face 105 are in planes which would eventually intersect if they were extended. While the front face 106 faces upward, and the back face 105 faces downward, the two planes are not parallel. In one embodiment the top face 102 has a shorter height than the bottom face 104, while in other embodiments the opposite is true. The slope of the side faces 103 will depend upon the desired application and can vary as needed.

Figure 4:
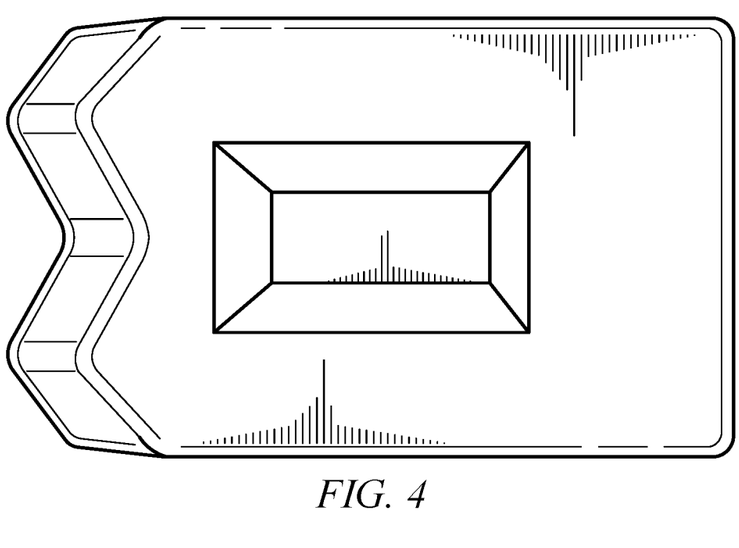
FIG. 4 is a bottom planar view of the back face in one embodiment.

Turning to FIG. 4, FIG. 4 is a bottom planar view of the back face in one embodiment. The back face 105 can comprise a variety of features depending upon the desired application. As depicted, the back face 105 comprises a plurality of teeth used for gnawing wood. Other back faces 105 using dissimilar features can also be utilized.

Figure 6A:
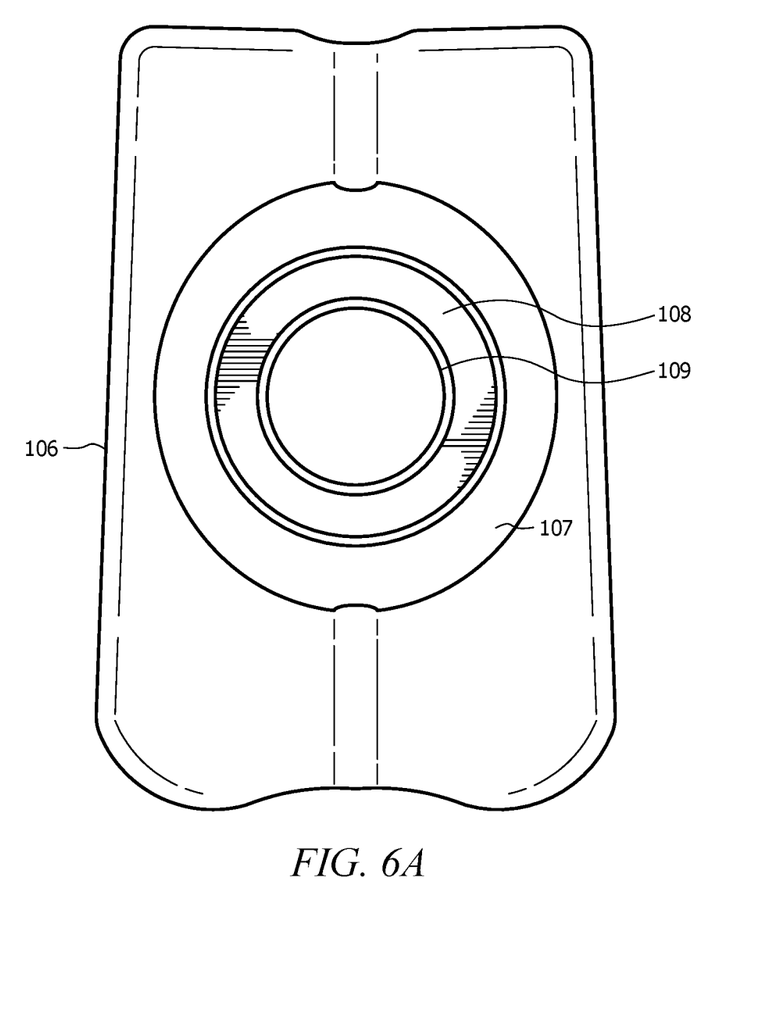
FIG. 6A is a planar view of an embodiment of the unit.
Figure 6B:
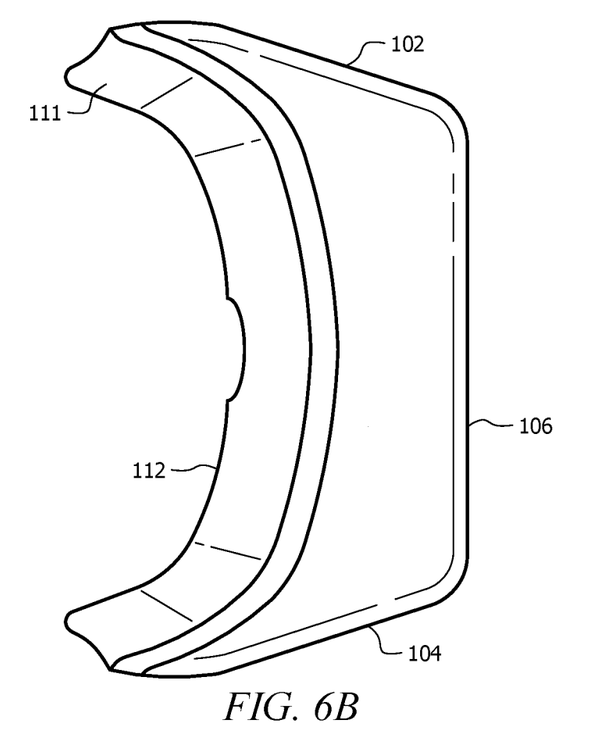
FIG. 6B is side view of an embodiment of the unit.
Figure 6C:
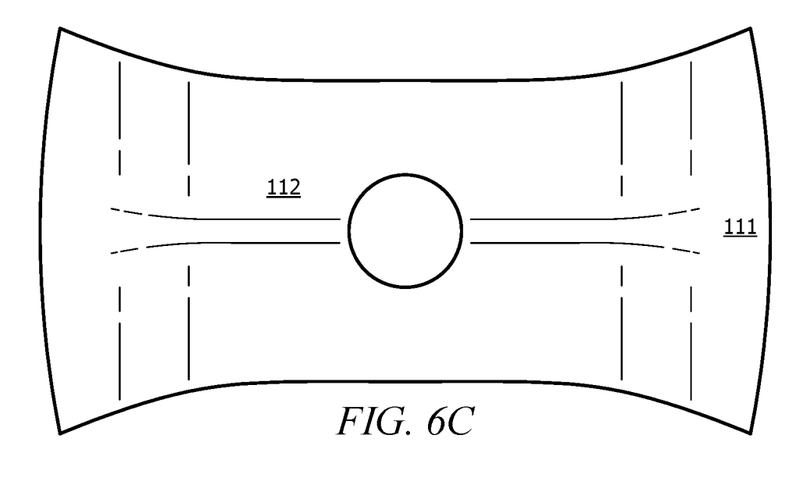
FIG. 6C is a perspective view of an embodiment of the unit.

FIG. 6A is a top planar view of a unit in one embodiment. FIG. 6B is side view of the unit in one embodiment. FIG. 6C is a perspective view of a unit in one embodiment. As seen in FIGS. 6A-6C, the shape of the unit 101 can be varied for various applications. As depicted, the engaging tool 101 comprises fins 111 extending from the top 102 of the engaging tool and the bottom 104 of the engaging tool towards the back of the tool. The front face 106, shown in FIG. 6A is similar to the front face 106 previously disclosed. It also comprises a tube 108 which comprises threads 109.

In one embodiment, and as depicted, the engaging tool 101 contains a concave V-shaped front face 106 and a convex V-shaped back face 112. In one embodiment, the channel opening 108 containing threading 109, opens from the front surface 106 and extends to the back surface 110 of the engaging tool 101. Accordingly, the cavity 114 comprises an unrestricted cavity as the cavity extends from the front face 106 to the back face 105. In another embodiment, the cavity 114 does not extend to the back surface 110 of the engaging tool 101.

While FIG. 6C shows two fins 111 this is for illustrative purposes only and should not be deemed limiting. In one embodiment the back face 105, for example, only contains a single fin 111.

While the invention has been particularly shown, and described with reference to a preferred embodiment, it will be understood by those skilled in the art that various changes in form and detail may be made therein without departing from the spirit and scope of the invention.

Additional Description

The following clauses are offered as further description of the disclosed invention.

Clause 1. An engaging tool, said tool comprising:
a front face and a back face connected by two opposing side faces and an opposing top face and base face;
wherein said front face comprises a concave shape;
wherein said front face comprises an outer channel which extends inwardly into said front face;
a tube extending outwardly from said front face, wherein said tube is located within said outer channel.

Clause 2. The engaging tool of any proceeding or preceding claim wherein said two opposing sides are approximately parallel to one another, and wherein said two opposing sides are approximately perpendicular to said top face.

Clause 3. The engaging tool of any proceeding or preceding claim wherein said tube and said engaging tool comprise a single integrally made piece.

Clause 4. The engaging tool of any proceeding or preceding claim wherein said tube comprises internal threading.

Clause 5. The engaging tool of any proceeding or preceding claim wherein said tube comprises a hollow internal cavity.

Clause 6. The engaging tool of any proceeding or preceding claim wherein said internal cavity extends from said tube and through the entirety of said engaging tool.

Clause 7. The engaging tool of any proceeding or preceding claim wherein said internal cavity comprises an unrestricted cavity.

Clause 8. The engaging tool of any proceeding or preceding claim wherein said internal cavity comprises a restricted cavity.

Clause 9. The engaging tool of any proceeding or preceding claim wherein said front face comprises two opposing downwardly sloping sides, wherein said downward and inwardly sloping sides intersect at an inflection point.

Clause 10. The engaging tool of any proceeding or preceding claim, wherein said inflection point is located approximately at a midpoint along said width of said front face.

Clause 11. The engaging tool of any proceeding or preceding claim wherein a midpoint of said tube is located approximately at said inflection point.

Clause 12. The engaging tool of any proceeding or preceding claim wherein said tube has top, and wherein said top is lower in elevation than the elevation of said side face.

Clause 13. The engaging tool of any proceeding or preceding claim wherein said tube is permanently attached to said front face.

Clause 14. The engaging tool of any proceeding or preceding claim further comprising fins which extend from the top and base sides.

Clause 15. The engaging tool of any proceeding or preceding claim wherein said front face comprises a V-shaped concave shape.

Clause 16. The engaging tool of any proceeding or preceding claim wherein said back face comprises a V-shaped convex shape.

Clause 17. The engaging tool of any proceeding or preceding claim further comprising at least one fin which extends from the top side.

What is claimed is:

1. An engaging tool, said tool comprising:
a front face and a back face connected by two opposing side faces and an opposing top face and base face;
wherein said front face comprises a concave V-shape, wherein said V-shape extends from said top face to said base face;
wherein said front face comprises an outer channel which extends inwardly into said front face;
a tube extending outwardly from said front face, wherein said tube comprises internal threading;
wherein said outer channel comprises an outer concentric circle and wherein said tube is located within said outer channel.

2. The engaging tool of claim 1 wherein said two opposing sides are approximately parallel to one another, and wherein said two opposing sides are approximately perpendicular to said top face.

3. The engaging tool of claim 1 wherein said tube and said engaging tool comprise a single integrally made piece.

4. The engaging tool of claim 1 wherein said tube comprises a hollow internal cavity.

5. The engaging tool of claim 4 wherein said internal cavity extends from said tube and through the entirety of said engaging tool.

6. The engaging tool of claim 4 wherein said internal cavity comprises an unrestricted cavity.

7. The engaging tool of claim 4 wherein said internal cavity comprises a restricted cavity.

8. The engaging tool of claim 1 wherein said front face comprises two opposing downwardly sloping sides, wherein said downward sloping sides intersect at an inflection point.

9. The engaging tool of claim 8, wherein said inflection point is located approximately at a midpoint along said width of said front face.

10. The engaging tool of claim 8 wherein a midpoint of said tube is located approximately at said inflection point.

11. The engaging tool of claim 1 wherein said tube has top, and wherein said top is lower in elevation than the elevation of said side face.

12. The engaging tool of claim 1 wherein said tube is permanently attached to said front face.

13. The engaging tool of claim 1 further comprising fins which extend from the top and base sides.

14. The engaging tool of claim 1 wherein said V-shape extends from said top face to said base face at a constant V-shape with a constant slope.

15. The engaging tool of claim 14 wherein said back face comprises a V-shaped convex shape.

16. The engaging tool of claim 1 further comprising at least one fin which extends from the top side.

17. The engaging tool of claim 8 wherein said two opposing downwardly sloping sides comprise a uniform slope from the top face to said base face.

* * * * *